Nov. 26, 1929.     S. B. HENDRICKS     1,737,420

DISK PLOW

Filed July 23, 1927     2 Sheets-Sheet 2

Inventor:
Simeon B. Hendricks
By Wilson & McCanna
Attys.

Patented Nov. 26, 1929

1,737,420

UNITED STATES PATENT OFFICE

SIMEON B. HENDRICKS, OF ROCKFORD, ILLINOIS, ASSIGNOR, BY MESNE ASSIGNMENTS, TO J. I. CASE COMPANY, OF RACINE, WISCONSIN, A CORPORATION OF WISCONSIN

DISK PLOW

Application filed July 23, 1927. Serial No. 207,911.

This invention relates to disk plows.

The principal object of the invention is to provide a straight running, heavy duty plow, extremely sturdy and durable in construction, and so designed that the same is comparatively easy to assemble and the parts are tractable for handling in shipment.

With the foregoing object in mind I have incorporated the following features, to wit:—

1. The provision of the gang of plow disks in two or more sections, the several gang sections being arranged for easy coupling in the assembling of the plow through interlocking means so designed and constructed that all of the plow disks are held absolutely in alignment and will operate in the desired unison as if in a single unit gang. In the present case where the plow has twenty disks, I prefer to divide the disks into two gangs of ten each, thus providing sections light enough for two men to handle with comparative ease. It is, therefore, possible to ship the plow in a semi-disassembled condition.

2. The provision of a thrust bearing to assume the end thrust of the plow disks in operation, the bearing being of a self-aligning type and dirt and water-proof so as to insure long service as well as smooth and easy running. The self-aligning feature is of particular advantage in the assembling of the plow and very little precaution has to be taken to get the parts together properly and very little mechanical skill is required on the part of the assembly-man.

These and other features of my invention will appear in the course of the following detailed description wherein reference is made to the accompanying drawings in which—

Figure 3:
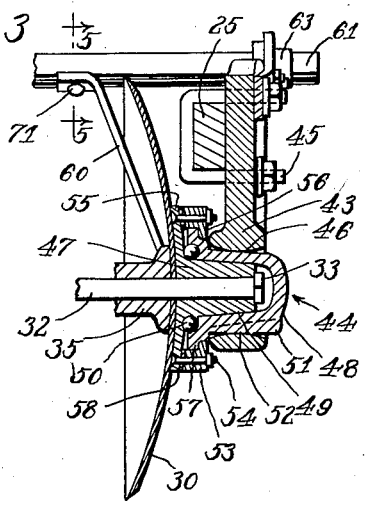
Fig. 3 is a central vertical section through Fig. 2 taken on the line 3—3 thereof.
Figure 6:
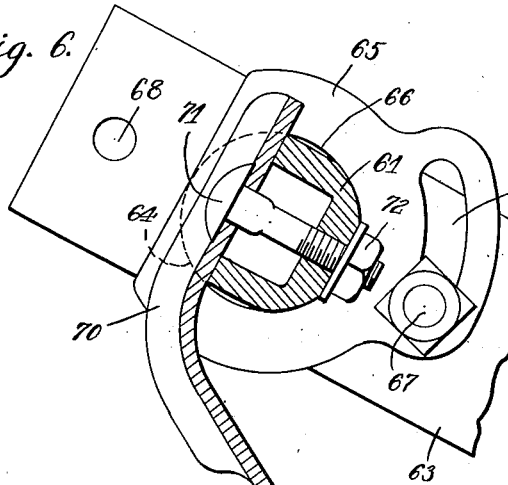
Figure 4:
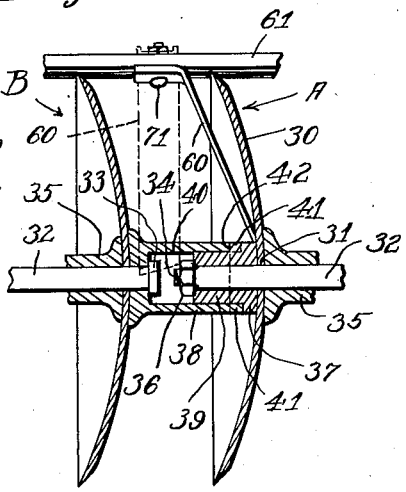
Fig. 4 is a section through the coupling between the gang sections taken on the line 4—4 of Fig. 1.
Figure 5:
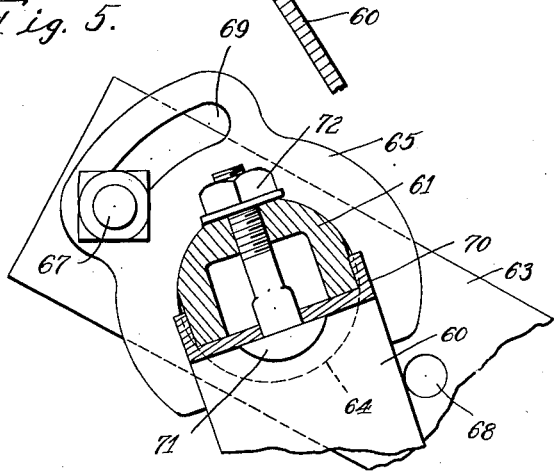

Fig. 5 is an enlarged sectional detail of the combination scraper and trash guard blade mounting taken on the line 5—5 of Fig. 3, in which figure the blade is shown used as a scraper the same as in Fig. 4. In the latter figure there is indicated in dotted lines the position of the blade when used as a trash guard; and Fig. 6 is a view similar to Fig. 5 showing the parts rearranged so that the blade acts as a guard.

The same reference numerals are applied to corresponding parts throughout the views.

Figure 1:
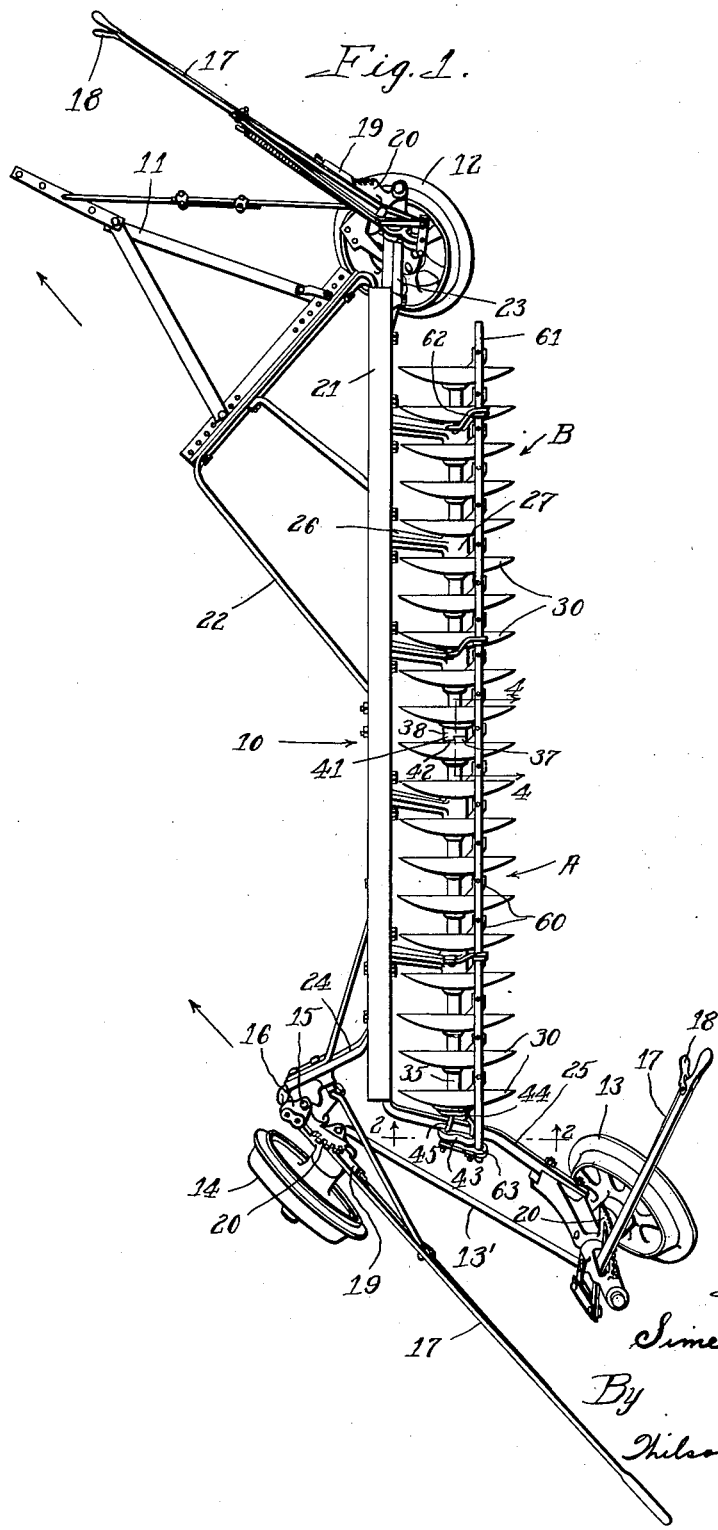
Figure 1 is a plan view of a disk plow made in accordance with my invention.

The plow in which the present improvements are embodied comprises a frame designated generally by the reference numeral 10 having hitch bars 11 at the forward end for coupling the plow to a tractor. The line of draft is indicated by the arrows in Fig. 1. The frame 10 is supported by the usual front furrow wheel 12, rear furrow wheel 13, and land wheel 14. The wheels 13 and 14 have their axles swingably mounted with reference to the frame to permit changing the plow from the set-up for plowing to that for transporting. The pin 15 is removably engaged in either one of two holes provided therefor in the quadrant 16 of the land wheel 14. When the pin 15 is removed from the hole in which the same is engaged for plowing, the wheel 14 is free to be swung in a clockwise direction. The wheel 13 is arranged to be swung with it by means of the link 13' and then, when the pin is inserted in the other hole provided for the purpose, the plow will be set for trailing. This feature is well known and requires no further explanation. The hitching bars 11 are also arranged for quick adjustment to make the plow trail. The levers shown at 17 are swingable with the various wheels with reference to the frame and have the thumb pieces 18 for operating latches 19 on notched sectors 20 for raising and lowering the frame in a manner well known in the art. So much for a general understanding of the type of plow to which the present invention relates.

The frame 10 comprises a T-beam 21 to which the bracket 22 for the hitch and the bracket 23 for the front furrow wheel are bolted at the forward end, as indicated, and to which a bracket 24 for the land wheel and a rearwardly offset bracket 25 for the rear furrow wheel are also bolted at the rear end, as indicated. The beam 21 also has arms 26 bolted thereto providing journal bearings 27 at their lower ends for the support of the gang of plow discs 30. More specifically stated, there are two distinct gang sections as designated at A and B which, however, for all practical purposes may be considered as a single unit gang since they are arranged to be coupled together, as will hereinafter appear, for operation in unison. As above stated, I prefer to have the gang of plow disks divided into two unitary assembles so as to make it possible for two men to handle the sections without difficulty when the plow is being shipped in a semi knocked-down condition. In both of the gang sections the disks 30 have square center holes 31 to fit on the square shafts 32. The latter are headed at one end, as indicated at 33 in Fig. 3, and have a screw-threaded bolt end at the other end, as indicated at 34 in Fig. 4. Assembled with the disks on the shafts 32 are spacing spools 35, one of which is disposed between each pair of successive disks. Nuts 36 (see Fig. 4) threading on the ends of the shafts 32 are arranged, when tightened, to fasten the plow disks rigidly in assembled relation in the gang sections so that the sections A and B may be handled as separate units. The junction between the two sections is clearly illustrated in Fig. 4 wherein the end spool 37 of section A is conformed to serve as a coupling spool to cooperate with the end spool 38 of a complementary form in section B. The end spools 37 and 38 interfit and interlock so as to communicate rotation from the one section to the other and also hold the sections in absolutely true alignment. For these purposes the spool 37 has a projecting cylindrical boss 39 arranged to be received in the recess 40 of the spool 38 and the two spools have projections 41 arranged to fit in complementary recesses 42. The interfitting of the boss 39 in the recess 40 holds the sections in exact alignment and the interlocking of the projections 41 in the recesses 42 serve to transmit rotation from the one section to the other. Two sections are thus insured of operation in the desired unison and alignment. It is obviously a simple matter to couple and uncouple the gang sections with the means which I have provided and the coupling is of a sturdy and economical construction.

In the assembling of the gang sections A and B the arms 26 are not secured in final position until the sections have been forced back properly against a thrust bearing bracket 43 so that the entire end thrust on the disks incident to the operation of the plow is assumed at the bracket 43 in a bearing indicated generally by the reference numeral 44. That there will be such end thrust will be evident when it is considered that the plow is pulled at an angle of about 40° to the line of draft indicated by the arrows in Fig. 1. The bracket 43 depends from the bracket 25, as clearly indicated in Fig. 3 and is fastened to said bracket by U-bolts 45. The bearing 44 is of a somewhat tapered form and projects through an opening 46 provided in the bracket 43, the said opening being flared outwardly forwardly and rearwardly to make the bearing take its own seat in the opening. That is, there will be no need for precise setting of the bracket 43 or of the arms 26 in order to secure a proper mounting of the bearing 44; the latter is always bound to find its fit. The bearing 44 comprises an inner rotary part 47 and an outer stationary part 48, the former being received in a bearing opening 49 in the latter and having anti-friction bearing balls 50 disposed therebetween to assume the end thrust. The stationary part 48 is held against turning by a key projection 51 cast integral therewith and received in a key-way 52 cast in the opening 46 in the bracket 43. In order to insure against the entry of dirt, grit, water, or any foreign substance into the bearing 44 I have provided a sealing ring 53 which is bolted, as indicated at 54, to a flange 55 of the rotary part 47 and has an annular lip 56 to overlie an annular flange 57 provided on the stationary part 48. A packing washer 58 introduced between the ring 53 and the flange 55 serves to make the joint between the two parts dirt-proof as well as water-tight. The positive prevention of any fouling of the bearing by the means shown has been found to reduce wear to a minimum and replacements, which are otherwise a frequent necessity in bearings on implements of the present character, are found to be very seldom necessitated.

Figure 2:
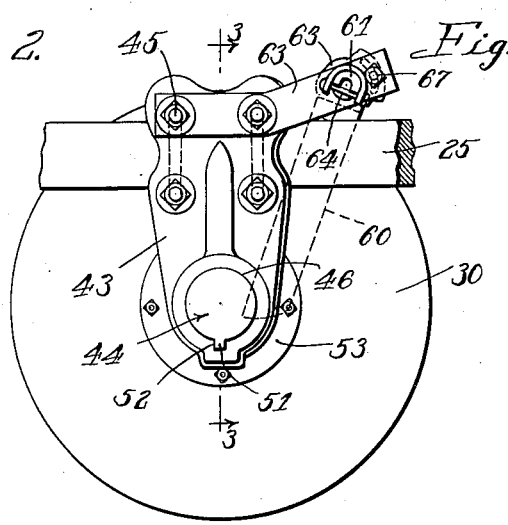
Fig. 2 is a view of the end thrust bearing taken on the line 2—2 of Fig. 1.

The disks 30, in the case of ordinary plowing as for example in breaking meadows or in oat field plowing, are arranged to be kept clean by scraping blades. For other kinds of plowing as for example wheat or cotton field plowing, or wherever high stubble, trash, or weeds tend to wind about the disks and onto the spools therebetween and choke the same, the disks have to be guarded if there is to be efficient operation. In some instances both scraping blades and guards are required at the same time, but very rarely. Having this in mind I have, therefore, provided blades 60 for the disks 30, at least one for each disk, arranged when set in one position to serve as scrapers and when set in another position to serve as guards. This subject matter is covered in a divisional application, Serial No. 281,667, filed May 31, 1928. In Figs. 1, 3, 4 and 5 the blades 60 are shown in position bearing against the sides of the disks 30 to act as scrapers. In Fig. 6 I have shown the position of the blades when used as guards and have also illustrated in Fig. 4 in dotted lines the guard position. When serving as guards the blades are disposed in intermediate positions approximately midway between the adjoining disks. The blades are mounted on a bar 61 which in turn is supported on arms 62 extending from the arms 26 and an arm 63 fixed to the bracket 43. The bar 61 is channel-shaped in cross-section, as clearly indicated in Figs. 2, 5 and 6, and is arranged for rotation in circular openings 64 provided in the arm 63 and similarly in the arms 62. A bracket 65 having an opening 66 therein conforming to the section of the bar 61 is received on the bar and is arranged to be fastened to the arm 63 by a bolt 67 in either one of the two positions shown in Figs. 5 and 6, the bolt 67 being received in openings 68 provided in the arm 63 and in an arcuate slot 69 provided in the bracket 65. The purpose for the slot 69 will presently appear. When the bar 61 is in the position shown in Fig. 5, that is, with the longitudinal flanges thereof directed inwardly toward the disks 30 the blades 60 are arranged to be secured thereto with their channel-shaped offset ends 70 fitting over the bar 61 in longitudinal alignment therewith so that when the bolts 71, passing through the offset end portions of the blades 60 and through the bar 61, are secured by the tightening of the nuts 72 the blades are held against turning with reference to the bar and will remain in the proper position with respect to the plow disks, against the sides of which the blades are arranged to bear in the manner indicated in Figs. 3 and 4. At this point it will be apparent that some slight adjustment of the blades 60 may be desired so as to scrape the disks efficiently. For this reason the arcuate slot 69 is provided in the bracket 65. When the bolt 67 is loosened the bar 61 may be turned slightly to swing all of the blades 60 together with reference to the plow disks. When the proper position is reached the tightening of the bolt 67 maintains the desired adjustment. If, however, the blades 60 are to be used as guards the bar 61 is turned from the position shown in Fig. 5 to the position shown in Fig. 6 and is secured in such position by the passing of the bolt 67 through the other hole 68 in the arm 63. This throws the longitudinal flanges of the bar 61 on the side away from the plow disks and the flat surface presented by the edges of the flanges provides a place for bolting the offset end portions of the blades to the bar, the offset end portions of the blades being disposed substantially in right angular relation to the bar, as clearly illustrated. In this case, as in the other case, the slot 69 in the bracket 65 permits whatever adjustment in the position of the blades may be found necessary or desirable.

I claim:

1. In a disk plow, the combination with a frame having supporting wheels, and hitching means whereby the same may be pulled, of a gang of plow disks mounted on said frame on supporting arms which provide journal bearings for the axle part thereof, said frame having an offset portion extending past the end disk of the gang, and a thrust bearing mounted on said offset portion to assume the end thrust of the gang in the operation of the plow, the end thrust bearing being universally self-aligning in its mounting on the offset portion of said frame.

2. In a disk plow comprising a frame and a gang of plow disks mounted on said frame so as to be drawn at an angle to the line of draft, a thrust bearing for the end of the gang to assume the end thrust incident to the operation of the plow, said bearing comprising a rotary part turning with the plow disks, a stationary part receiving the rotary part and mounted in the frame and arranged to assume the end thrust communicated to the rotary part in the operation of the plow, the one part having an annular flange, and a sealing ring fixed to the other part and having an annular lip overlying said annular flange so as to seal the joint between the relatively rotating parts.

3. In a disk plow comprising a frame, a gang of plow disks mounted on said frame so as to be drawn at an angle to the line of draft, and a thrust bearing for the end of the gang having a universal self-seating mounting on the frame to assume the end thrust incident to the operation of the plow and permit universal tilting of the gang with respect to the frame so that the gang is self-aligning relative to the frame.

4. In a disk plow comprising a frame and a gang of plow disks mounted on said frame so as to be drawn at an angle to the line of draft, a thrust bearing for the end of the gang to assume the end thrust incident to the operation of the plow, said bearing comprising a rotary part turning with the plow disks, a stationary part receiving the rotary part and assuming the end thrust transmitted thereto in the operation of the plow, the stationary part being received in an opening in a part of the frame, the stationary part being held against turning with respect to the frame part by the interfitting of a projection provided on the one part in a recess provided in the other part, the opening in the frame part being flared outwardly so as to permit the universal tilting of the stationary bearing part with respect to the frame part for the purpose described.

5. In a disk plow comprising a frame and a gang of plow disks mounted on said frame so as to be drawn at an angle to the line of draft, a thrust bearing for the end of the gang to assume the end thrust incident to the operation of the plow, said bearing comprising a rotary part turning with the plow disks, a stationary part receiving the rotary part and mounted in the frame and arranged to assume the end thrust communicated to the rotary part in the operation of the plow, the one part having an annular flange, and a sealing ring fixed to the other part and having an annular lip overlying said annular flange to seal the joint between the relatively rotating parts, the mounting of said stationary part comprising a frame part having an opening therein, the stationary part being held against turning with respect to the frame part by the interfitting of a projection provided on the one part in a recess provided in the other part, the opening in the frame part being flared outwardly in both directions so as to permit the universal tilting of the stationary bearing part with respect to the frame part for the purpose described.

6. In a disk plow, comprising a frame and a gang of plow disks mounted on said frame so as to be drawn at an angle to the line of draft, a thrust bearing for the end of the gang to assume the end thrust incident to the operation of the plow, said bearing comprising a rotary part turning with the plow disks, a stationary part receiving the rotary part and mounted in the frame and arranged to assume the end thrust communicated to the rotary part in the operation of the plow, said stationary part being mounted for substantially universal movement with reference to the frame, and means for holding the rotary and stationary parts together while permitting rotation of the former with respect to the latter.

In witness of the foregoing I affix my signature.

SIMEON B. HENDRICKS.